(12) United States Patent
Wieczorek

(10) Patent No.: US 7,020,389 B2
(45) Date of Patent: Mar. 28, 2006

(54) FUEL HEATER WITH CAM REMOVAL FEATURE

(75) Inventor: Mark T. Wieczorek, Cookeville, TN (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 10/933,780

(22) Filed: Sep. 3, 2004

(65) Prior Publication Data

US 2005/0084256 A1   Apr. 21, 2005

Related U.S. Application Data

(63) Continuation-in-part of application No. 10/689,974, filed on Oct. 21, 2003, now Pat. No. 6,795,646.

(51) Int. Cl.
*F24H 1/10* (2006.01)

(52) U.S. Cl. ........................ 392/485; 219/205

(58) Field of Classification Search ............. 392/485, 392/502; 219/205–207; 210/149, 184
See application file for complete search history.

(56) References Cited

U.S. PATENT DOCUMENTS

| | | | |
|---|---|---|---|
| 3,235,084 A | 2/1966 | King et al. ............. 210/149 |
| 4,091,265 A | 5/1978 | Richards et al. ............ 219/501 |
| 4,242,564 A | 12/1980 | Kendall ................ 219/208 |
| 4,372,260 A | 2/1983 | Baker ................. 123/142.5 E |
| 4,406,785 A | 9/1983 | Siefer .................... 210/186 |
| 4,442,819 A | 4/1984 | Veach ................... 123/557 |
| 4,477,715 A | 10/1984 | Bell et al. ................ 219/205 |
| 4,529,866 A | 7/1985 | Leary ................... 219/205 |
| 4,539,108 A | 9/1985 | Izutani et al. ............. 210/104 |
| 4,571,481 A | 2/1986 | Leary ................... 219/205 |
| 4,585,924 A | 4/1986 | Pakula .................. 219/205 |
| 4,596,224 A | 6/1986 | Prager .................. 123/557 |
| 4,713,524 A | 12/1987 | Leo et al. ............... 219/307 |
| 4,719,012 A | 1/1988 | Groezinger et al. ........ 210/232 |
| 4,818,842 A | 4/1989 | Walty .................. 219/205 |
| 4,861,966 A | 8/1989 | Matthiesen et al. ......... 219/295 |
| 4,881,508 A | 11/1989 | Van Den Elst et al. ...... 123/549 |
| 5,025,131 A | 6/1991 | Van Konyenburg et al. ..... 392/451 |
| 5,093,898 A | 3/1992 | Van Konyenburg et al. ..... 392/451 |
| 5,855,772 A | 1/1999 | Miller et al. ............. 210/86 |
| 5,958,237 A | 9/1999 | Cort et al. ............. 210/416.4 |
| 6,402,943 B1 | 6/2002 | Bohlender ............... 210/184 |
| 6,493,508 B1 | 12/2002 | Roesgen ................ 392/485 |
| 6,795,646 B1 * | 9/2004 | Wieczorek et al. ......... 392/485 |

* cited by examiner

*Primary Examiner*—Thor S. Campbell
(74) *Attorney, Agent, or Firm*—Woodard, Emhardt, Moriarty, McNett & Henry LLP

(57) ABSTRACT

A fuel filter housing and fuel heater combination for a fuel-water separator includes, as part of the fuel filter housing, a heater-receiving bore and a protrusion adjacent the heater-receiving bore. The fuel heater is constructed and arranged for inserting into the bore and includes a flange that is attached to the housing for securing the fuel heater in position. The fuel heater includes a notch that is constructed and arranged with a ramp portion. With the fuel heater properly seated, the protrusion inserts into the notch and is seated against the ramp portion. O-ring seal swelling may cause the fuel heater to be difficult to remove and the protrusion cooperates with the ramp portion by way of a camming action to facilitate removal of the fuel heater from the bore under such conditions.

33 Claims, 15 Drawing Sheets

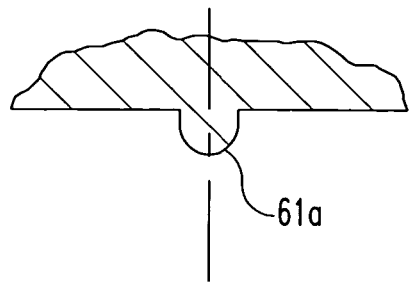
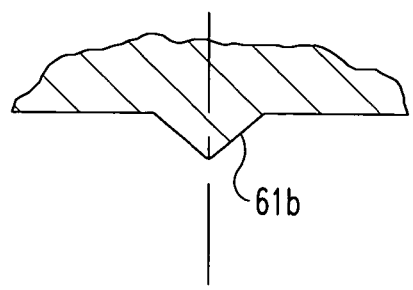
*Fig. 24A*  *Fig. 24B*
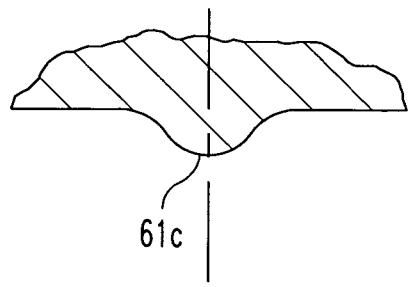
*Fig. 24C*
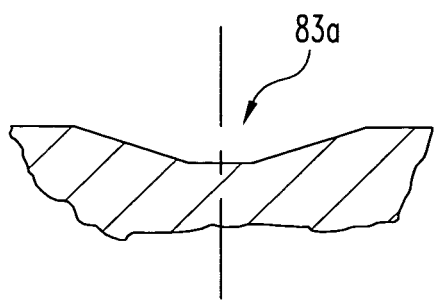
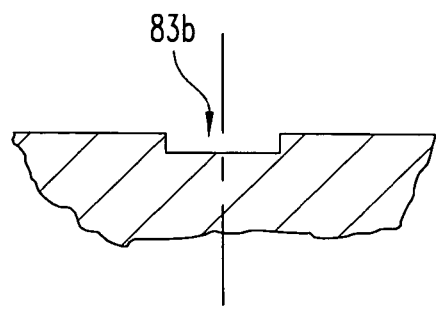
*Fig. 25A*  *Fig. 25B*

FUEL HEATER WITH CAM REMOVAL FEATURE

REFERENCE TO RELATED APPLICATION

The present application is a continuation-in-part patent application of U.S. patent application Ser. No. 10/689,974, filed Oct. 21, 2003 U.S. Pat. No. 6,795,646 entitled "Fuel Heater With Cam Removal Feature" which is hereby incorporated by reference in its entirety.

BACKGROUND OF THE INVENTION

The present invention relates in general to fuel heater elements and the structural design features that are associated with installation and removal of the fuel heater element from a housing. More specifically, the present invention relates to a rod-shaped heater for a fuel-water separator that includes a cam removal feature. As disclosed herein, the cam removal feature includes a cooperation between the fuel heater and a portion of the fuel filter housing that facilitates removal of the heater from the housing. The fuel filter that is described herein may include a fuel-water separation capability.

In the field of diesel engine technology, it is not uncommon for diesel fuel to require heating in order to reduce the chances that the fuel will assume a gel-like consistency that would in turn be difficult to deliver and process. Often, a suitable heater is assembled as part of a fuel filter or fuel-water separator to try and eliminate this potential problem. Since such a filter/separator may be used in low temperature conditions, though not continuously, the fuel heater is controlled by a thermostat that monitors the fuel temperature and is set to activate at a preset temperature, such as 35° F. When the fuel heater is energized, it generates a heat increase to the interior of the housing. This in turn liquefies any gelled fuel, allowing the fuel to flow freely.

While there are a variety of heater designs that are currently available or have been offered for use in fuel filters and fuel-water separators, a couple of the more common styles can be improved upon and are improved upon by the present invention. One such prior style is a ring heater that is installed into the filter/separator housing and is captured by its manner of insertion and attachment and/or by use of the closing lid. Ring heaters of the type described are relatively complex in construction and necessitate a fairly complex cooperating configuration within the filter housing. There may be added complexity, depending on the selected configuration and the interconnect with the thermostat and the electrical power connector. While the present invention is described in the context of a fuel-water separator, the invention is suitable for a fuel filter without any fuel-water separation capability.

One attempt to simplify the complexity of the ring heater is represented by the second prior style that can best be described as a rod heater. This descriptive name comes from the generally cylindrical shape of the fuel heater. This style of heater is typically threaded into a receiving bore in the fuel-water separator. Since there is fuel inside of the housing and since there is an internal pressure, it is important to adequately seal the interface between the heater and the separator housing. If a plastic housing is used, concerns have been raised as to whether sufficient tightening torque can be applied by way of the threaded engagement to adequately seal the threaded interface.

Another concern with a threaded engagement between the rod heater and the separator housing is the ability to establish the desired orientation for the electrical connector on the fuel heater relative to the housing. Over tightening or under tightening of the threaded engagement will cause the rotational position or orientation of the electrical connector to change. The starting point of the threaded engagement can also affect the orientation of the electrical connector. As such, the fuel heater may not be rotated into the preferred location for electrical connection to the heater wires from the wiring harness of the corresponding engine. It would therefore be an improvement if the heater could be installed in the housing with an automatic alignment capability. The present invention provides this improvement without relying on a threaded engagement between the heater and the fuel-water separator housing.

One of the realities of installing a rod heater into a fuel-water separator housing is the need to include a seal, such as an elastomeric O-ring seal, for establishing a sealed interface between the heater and the housing. Over time, the O-ring seal swells in size and becomes even tighter, tighter to the extent that it is difficult to break the O-ring seal free in order for removal of the heater. The effect of this O-ring seal swelling is to wedge the fuel heater into the separator housing (casting) to the point that the heater appears to be stuck and, as a result, not easily removed from the housing.

The present invention addresses this concern in a novel and unobvious way by creating a cooperating cam engagement between the fuel heater and the fuel-water separator housing. This cam action translates rotational motion of the fuel heater relative to the housing into an axial force to help break away the tightly wedged O-ring seal. Once the wedged seal is broken free, the fuel heater can be easily removed without the need for any special removal tool and without the risk of damaging the fuel heater. The fuel heater can be removed by hand and this provides yet another benefit attributable to the present invention.

SUMMARY OF THE INVENTION

The combination of a fuel filter housing and a fuel heater according to one embodiment of the present invention includes a heater-receiving bore and a protrusion adjacent the bore as part of the fuel filter housing. The fuel heater is constructed and arranged for inserting into the heater-receiving bore and for being attached to the fuel filter housing. The fuel heater includes a recessed notch that is constructed and arranged for engagement with the protrusion such that turning the fuel heater causes the protrusion to cooperate with a ramp portion of the notch in order to facilitate removal of the fuel heater from the heater-receiving bore by a camming action.

One object of the present invention is to provide an improved installation interface between a fuel filter housing and a fuel heater to facilitate removal of the fuel heater from the fuel filter housing.

Related objects and advantages of the present invention will be apparent from the following description.

BRIEF DESCRIPTION OF THE DRAWINGS

FIGS. 24A–24C are diagrammatic view illustrations of various protrusion configurations suitable for the present invention.

FIGS. 25A–25H are diagrammatic view illustrations of fuel heater notches that are suitable for use as part of the present invention.

DESCRIPTION OF THE PREFERRED EMBODIMENTS

Figure 1:
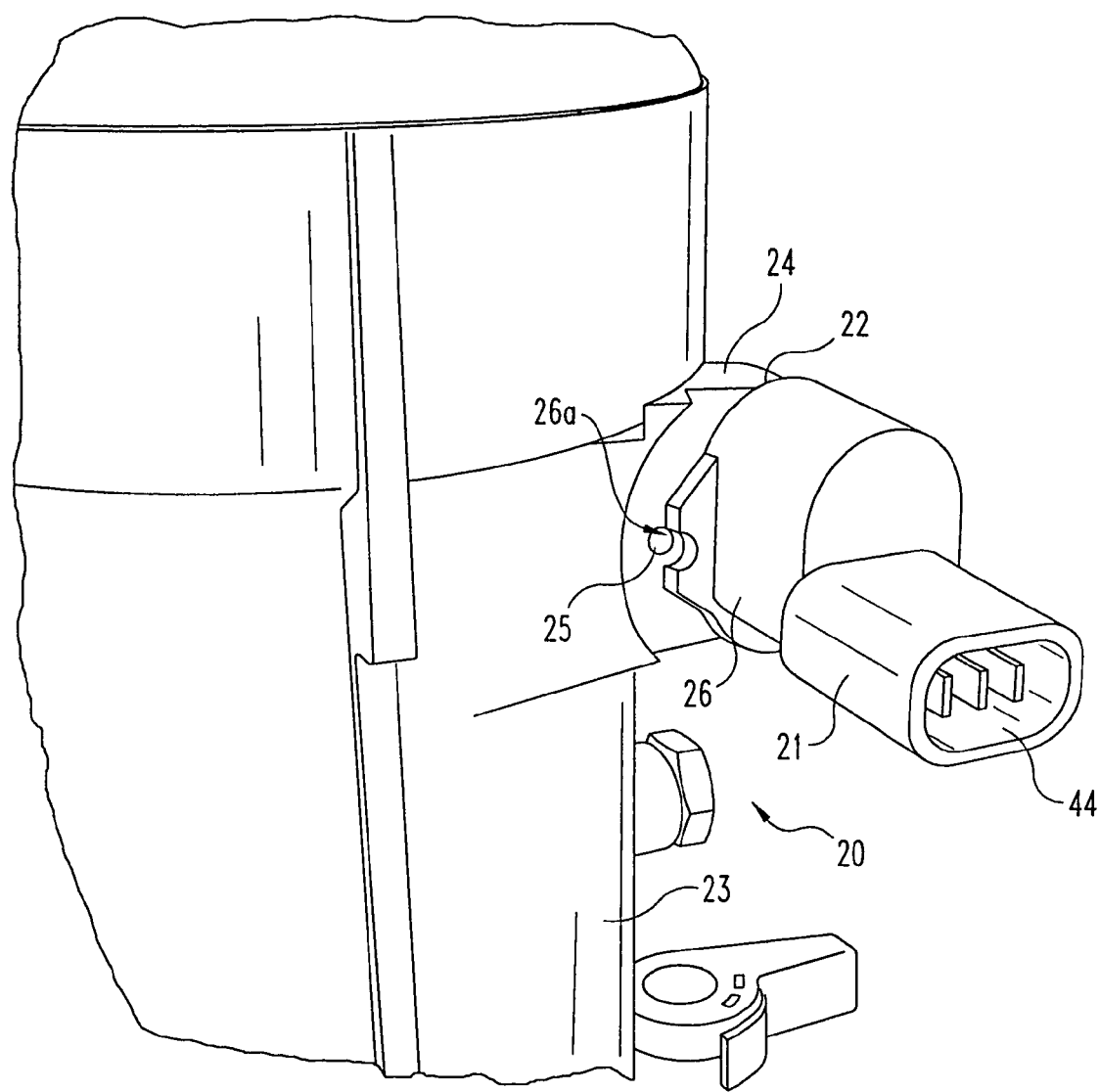
FIG. 1 is a perspective view of a fuel heater installed into a fuel-water separator housing according to the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a portion of a fuel-water separator 20 with a fuel heater 21 installed into a heater bore 22 that is defined by the wall of separator housing 23 according to one embodiment of the present invention. The boss 24 that surrounds bore 22 includes two mounting holes 25 that are constructed and arranged to receive threaded fasteners (not illustrated) that cooperate with fuel heater 21 to securely retain fuel heater 21 in bore 22. The mounting holes can be internally threaded or self-tapping screws can be used for the referenced threaded fasteners. The fuel heater 21 includes a mounting flange 26 that is configured with clearance slots 26a for receiving the threaded fasteners. Alternatively, the flange 26 can be constructed and arranged with clearance holes.

Figure 2:
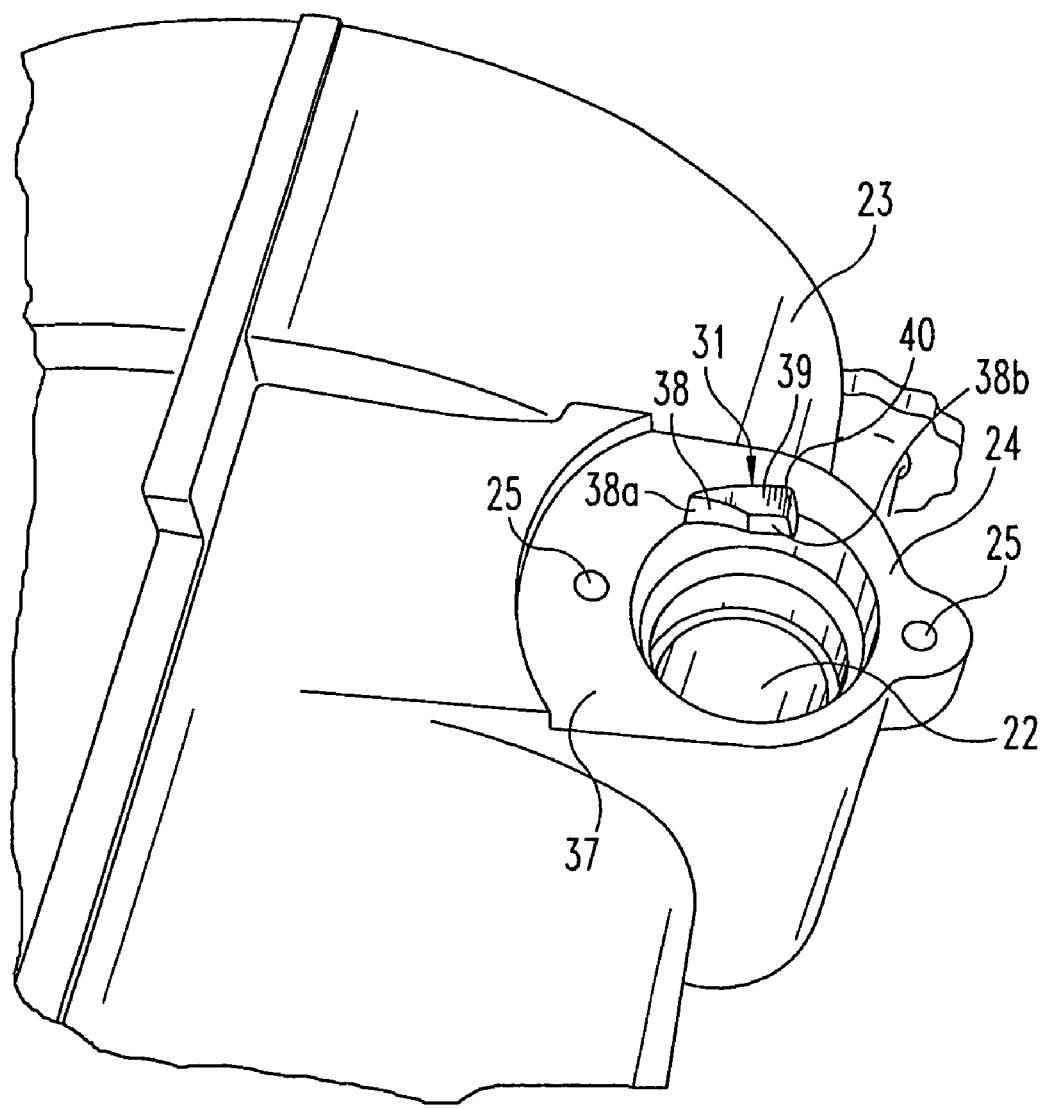
FIG. 2 is a partial, perspective view of the FIG. 1 fuel-water separator housing showing a heater-receiving bore.

Referring now to FIG. 2, the inside surface 30 of bore 22 defines a notch 31 according to one embodiment of the present invention. Notch 31 opens into bore 22 and has a circumferential extent of not more than 90 degrees relative to the heater receiving bore and cooperates with an oblong protrusion 32 that is constructed and arranged as part of the fuel heater 21, according to the present invention, to facilitate removal of fuel heater 21 from the bore 22 of housing 23, by a camming action.

Figure 3:
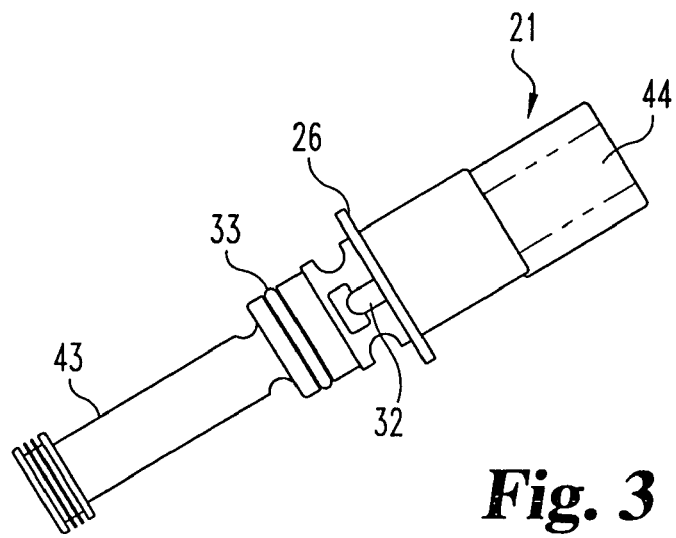
FIG. 3 is a diagrammatic, perspective view of the FIG. 1 fuel heater.
Figure 4:
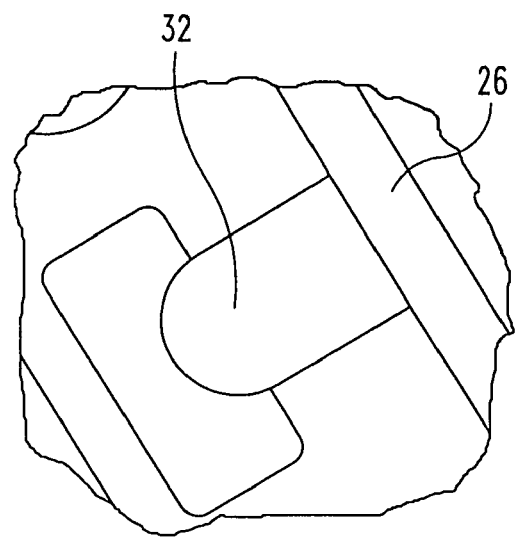
FIG. 4 is an enlarged detail of a cam protrusion comprising a portion of the FIG. 3 fuel heater.

Fuel heater 21 is illustrated in FIG. 3 and the protrusion 32 is illustrated in enlarged detail in FIG. 4. It is intended for fuel heater 21 to be considered as a conventional fuel heater as far as its general shape, mechanical structure, and its electrical construction and properties. The only modification of this otherwise conventional fuel heater 21 is the addition of protrusion 32. Protrusion 32 extends axially along a line that is parallel with the longitudinal axis of the fuel heater 21 and has a circumferential extent of not more than 90 degrees relative to the fuel heater body. Fuel heater 21 includes mounting flange 26 and an O-ring seal 33 that is positioned around fuel heater 21 at a location along the length of fuel heater 21 so as to establish a liquid-tight interface between fuel heater 21 and the separator housing 23.

When the fuel heater 21 is properly inserted into heater bore 22, flange 26 is adjacent the outer surface 37 of boss 24 and the O-ring seal 33 is in contact with the cooperating sealing surface of the separator housing 23. As the threaded fasteners are tightened into position, the fuel heater 21 becomes fully inserted, the O-ring seal 33 is compressed into liquid-tight contact, and flange 26 is drawn up tight against outer surface 37. As this is occurring, the protrusion 32 is drawn into contact with a ramp portion of notch 31.

Over time, with continued use of the fuel-water separator 20, the O-ring seal 33 swells and creates interference that actually locks or wedges the fuel heater 21 in the heater bore 22. As a result, any attempt to remove fuel heater 21 from bore 22 encounters added difficulty due to the interference created by the swelling of the O-ring seal 33. In effect, the fuel heater is locked in position relative to separator housing 23. In order to remove the fuel heater 21 from separator housing 23, this locked condition needs to be broken. It would be preferable to be able to break the fuel heater 21 free from the separator housing 23 without the need for special tools. This is where the present invention is employed and it provides an improvement in the area of fuel heater removal.

Figure 7:
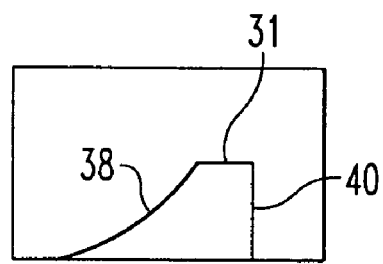
FIG. 7 is a diagrammatic view of a fuel-water separator housing notch that opens into the heater-receiving bore.
Figure 8:
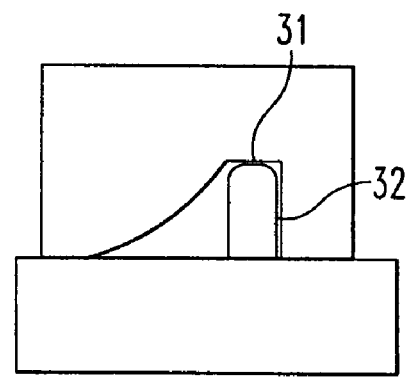
FIG. 8 is a diagrammatic view of the cooperating relationship between the FIG. 7 notch and the FIG. 4 protrusion.
Figure 9:
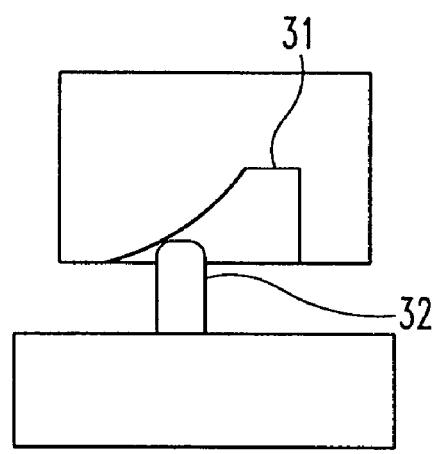
FIG. 9 is a diagrammatic view of the cooperating relationship between the FIG. 7 notch and the FIG. 4 protrusion.
Figure 10:
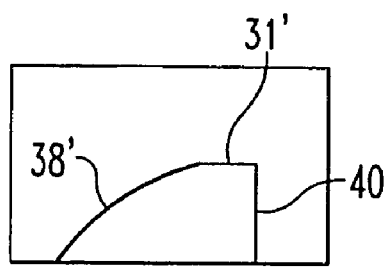
FIG. 10 is a diagrammatic view of an alternative fuel-water separator housing notch that opens into the heater-receiving bore.
Figure 11:
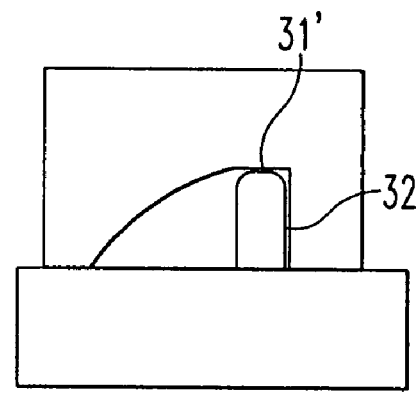
FIG. 11 is a diagrammatic view of the cooperating relationship between the FIG. 10 notch and the FIG. 4 protrusion.
Figure 12:
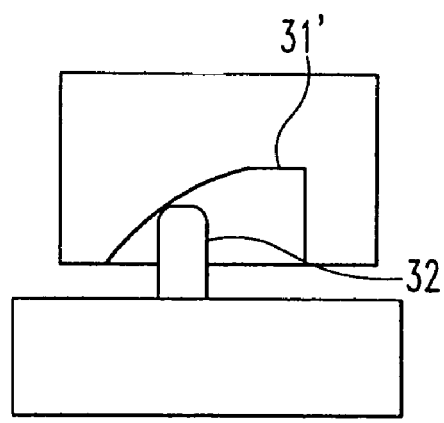
FIG. 12 is a diagrammatic view of the cooperating relationship between the FIG. 10 notch and the FIG. 4 protrusion.

With reference once again to FIG. 2, it will be seen that notch 31 is recessed down into the defining sidewall of boss 24. The referenced ramp portion 38 has a first section 38a with a convex curvature and a base section 38b that is generally flat. The ramp portion 38 extends from the outer surface 37 to its inwardly most portion which is base section 38b. In practice, the curved section 38a can be convex, as diagrammatically illustrated in FIGS. 7, 8, and 9, or concave, as diagrammatically illustrated in FIGS. 10, 11, and 12. The FIG. 2 and FIGS. 7–9 configurations are consistent with each other. With respect to FIGS. 10, 11 and 12, the intent is to show a second option (concave) for first section 38a. This alternative is identified as notch 31' and ramp portion 38'. The axial depth of notch 31 is set by ramp portion 38. The radial depth of notch 31 is set by wall 39 and the construction of notch 31 is completed by wall 40 that is substantially flat and parallel with the bore axis of heater bore 22. The overall shape and geometry of notch 31 can be seen in FIG. 2 and its cooperation with protrusion 32 (part of fuel heater 21) is diagrammatically illustrated in FIGS. 8 and 9.

Figure 5:
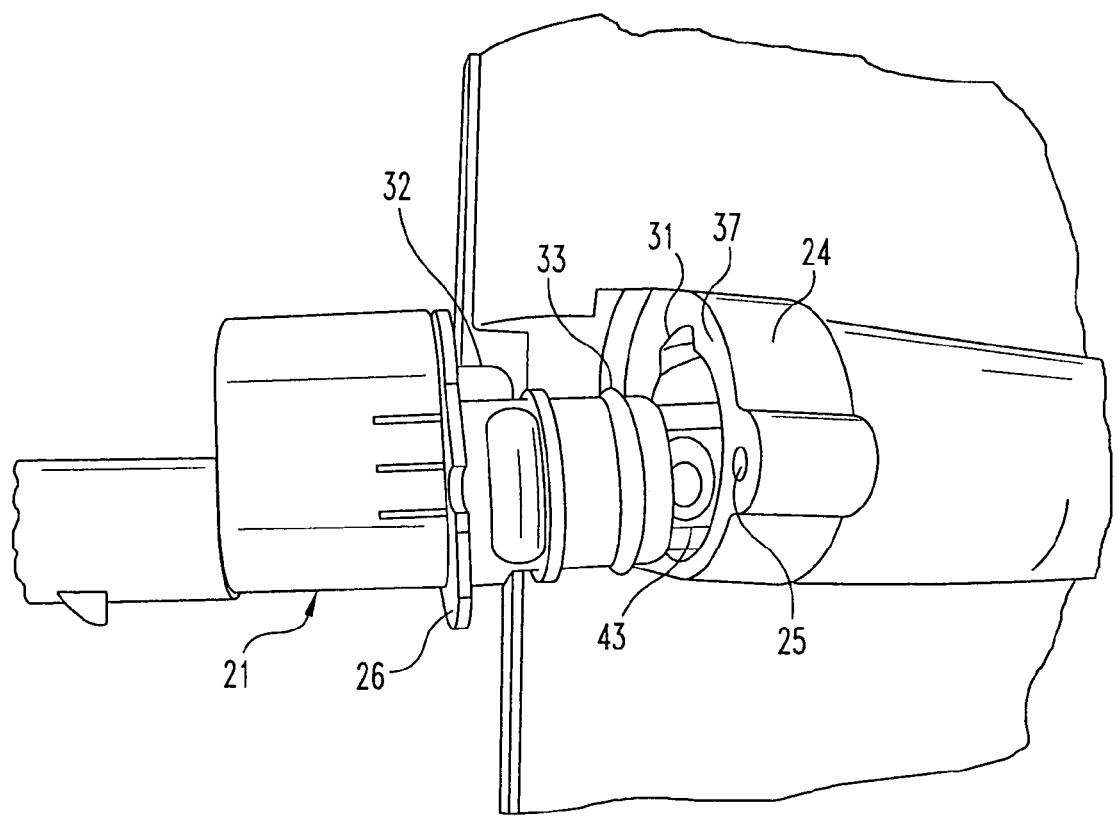
FIG. 5 is a perspective view of the initial step of installing the FIG. 3 fuel heater into the FIG. 2 heater-receiving bore.
Figure 6:
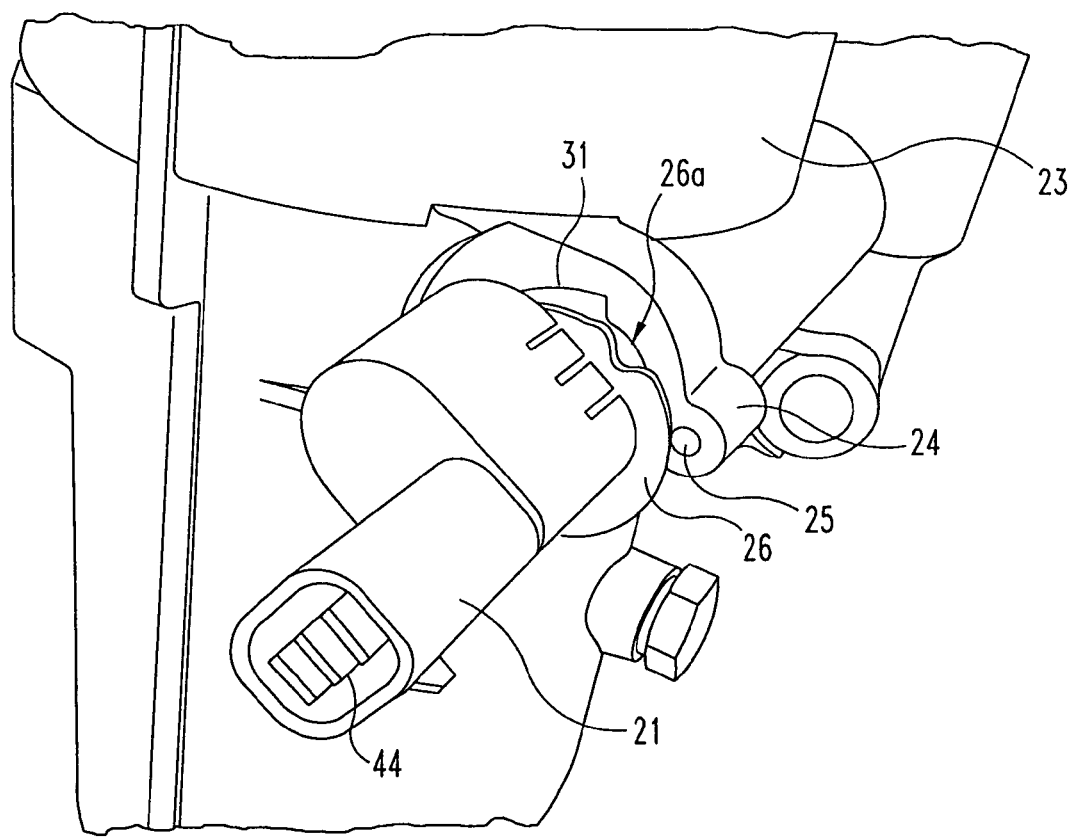
FIG. 6 is a perspective view of a subsequent step of installing the FIG. 3 fuel heater into the FIG. 2 heater-receiving bore.

Referring now to FIGS. 1, 5, and 6, the procedure for installing fuel heater 21 into housing bore 22 is illustrated. Beginning with fuel-water separator housing 23 and bore 22, fuel heater 21 (see FIG. 3) is selected and the heating end 43 is inserted into bore 22. Protrusion 32 is aligned with notch 31 and the installation procedure continues with the continued advancement of fuel heater 21 into separator housing 23. As flange 26 is advanced close to outer surface 37, it will be seen whether protrusion 32 is sufficiently close to notch 31 to be received within the notch. In order to fully insert the fuel heater 21 into housing 23, including proper compression of the O-ring seal 33, the protrusion 32 must be positioned up against wall 40 since this represents the location of the greatest or maximum axial depth of notch 31 and in turn the positioning of protrusion 32. If the fuel heater is not turned relative to bore 22 so that the protrusion lines up with the greatest axial depth location of notch 31, the protrusion 32 will presumably abut up against another part of ramp portion 38 that is axially outwardly relative to the maximum axial depth of notch 31. However, with continued advancement of the fuel heater 21 into the housing, the protrusion 32 is caused to slide down the first section 38a of ramp portion 38, allowing the fuel heater 21 to turn slightly in a clockwise direction so as to cooperate with the travel of the protrusion. The rounded tip of protrusion 32 facilitates the sliding action of the protrusion 32 against the ramp portion 38. In addition, as the fuel heater 21 turns so as to assume the desired position of protrusion 32 within notch 31, the clearance slots 26a are caused to line up with the boss mounting holes 25.

With protrusion 32 bottomed out against the base section 38b of ramp portion 38 at a location adjacent wall 40, the fuel heater 21 is properly oriented relative to separator housing 23. This proper orientation includes the correct positioning of electrical connector 44 for connection to the wires of the vehicle wiring harness for powering the fuel heater 21. The proper orientation and positioning of fuel heater 21 relative to boss 24 includes the correct positioning of the two flange slots 26a relative to the two mounting holes 25 for receiving the selected mounting hardware, in this case, externally-threaded fasteners.

When it is desired to remove fuel heater 21 from housing 23, the first step is to remove the two threaded fasteners (not illustrated) that secure flange 26 to outer surface 37. While it might be expected that this would be all that is needed, the swelling of the O-ring seal 33 causes the fuel heater 21 to be "stuck" in the heater bore 22. It thus becomes necessary to break loose the O-ring seal 33 and it would be an improvement to prior methods that use removal tools, some of which may have a specialized form, to be able to remove the fuel heater 21 by hand. This is where the present invention, with its cooperating protrusion 32 and notch 31, is used. With the present invention, all that has to be done in order to break the fuel heater 21 free is to turn (rotate) the fuel heater 21 in a counter clockwise direction, based upon the orientation of the fuel heater 21 in FIG. 1. The manual torque applied (by hand) to the outside diameter of the fuel heater 21 causes the protrusion 32 to slide across the surface of first section 38a of ramp portion 38 from a starting location adjacent wall 40 upwardly toward outer surface 37. Since the axial depth of ramp portion 38 is less as the counter clockwise rotation continues, the manual torque is converted into an axial force exerted through the protrusion against the ramp portion 38. This axial force helps to break free the fuel heater 21 and acts in pushing the fuel heater 21 out of heater bore 22. What results is a camming action using the cooperating relationship between the protrusion 32 and notch 31, specifically the ramp portion 38, to help the fuel heater 21 break free of any stuck or "frozen" condition due to the swelling of the O-ring seal 33. Once the fuel heater 21 breaks free, it can be easily removed from the fuel-water separator housing 23. The entire removal procedure is done by hand, without the need for any tools, special or conventional.

While the illustrated notch 31 has a circumferential arc length that is approximately about 30 degrees, this arc length can be increased which would result in a longer, more gradual ramp incline on portion 38. A 90 degree arc length for notch 31 would result in a quarter turn design for breaking free the fuel heater 21 from any stuck or wedged condition within bore 22 due to the swelling of O-ring seal 33. A 180 degree arc length would result in a half-turn design. An arc length of between 30 degrees and 90 degrees is likely preferred, but almost any arc length will work in accordance with the present invention.

Another design consideration and option is to vary the axial depth of notch 31. While the functional and structural characteristics of fuel heater 21 have to be considered, the only obvious effect of a deeper notch is the need to lengthen the protrusion so that once the heater is fully seated into the heater bore 22, the protrusion 32 continues to ride on the ramp portion 38. As would be understood, the curvature of first section 38a of ramp portion 38 is a function of the overall arc length of the notch as well as the axial depth of the notch relative to outer surface 37.

Another design variation that is contemplated for the present invention is to add a second notch and a second protrusion. This second cooperation combination of notch and protrusion would be spaced apart from the first cooperation combination. Preferably the spacing is envisioned to be less than 180 degrees so that the fuel heater 21 cannot be installed upside down, i.e., inverted 180 degrees from its designed orientation (see FIG. 1). A spacing of approximately about 120 degrees would avoid the 180 degree issue and avoid any interference with a location of either of the two mounting holes 25.

A still further design variation contemplated by the present invention is to reverse the notch and the protrusion. Rather than placing the protrusion as part of the fuel heater, the protrusion is included as part of the separator housing and design a cooperating notch into the fuel heater. Accordingly, the present invention specifically contemplates a cooperating relationship between the fuel heater and the separator housing that employs a camming action resulting from the turning or rotation of the fuel heater in a counter clockwise direction. Accordingly, the present invention can be described in the context of a fuel heater having a first camming member and a separator housing having a second camming member where these two camming members cooperate in order to facilitate removal of the fuel heater from the separator housing. This reverse construction for what has been described relative to FIGS. 1–12 is illustrated in greater detail hereinafter in connection with FIGS. 13–23.

A still further design variation contemplated for the present invention involves changing the overall size and shape of the protrusion whether as a part of the housing or as a part of the fuel heater. This reverse construction for what has been described relative to FIGS. 1–12 is illustrated in greater detail hereinafter in connection with FIGS. 13–23. Although the design illustrated includes a generally rectangular solid form with a rounded or radiused tip, other sizes and shapes may be suitable and are intended to be encompassed by the present invention. Some protrusion variations are illustrated in FIGS. 24A–24C. Variations are also contemplated for the cooperating notch, as illustrated in FIGS. 25A–25H.

Figure 13:
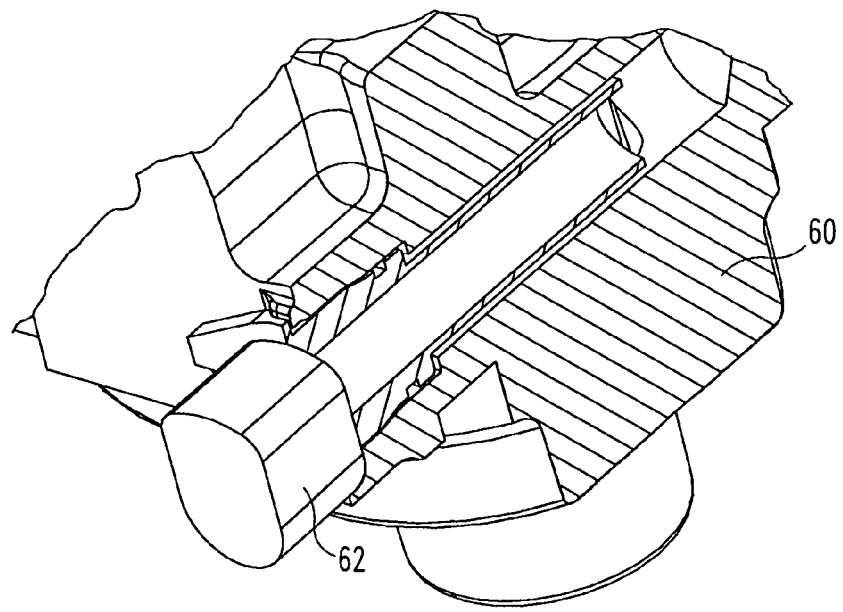
FIG. 13 is a partial, perspective view, in partial section, of a fuel heater installed into a fuel-water separator housing according to another embodiment of the present invention.
Figure 14:
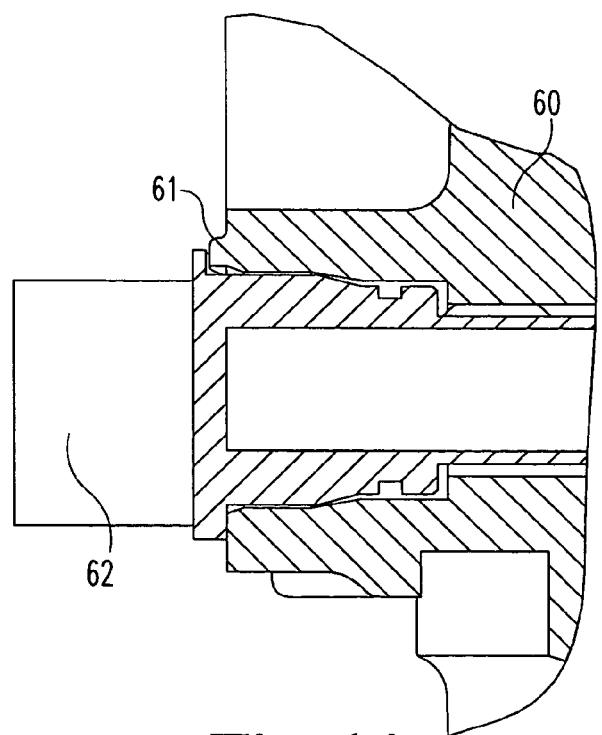
FIG. 14 is a partial, side elevational view, in full section, of the FIG. 13 structure.
Figure 15:
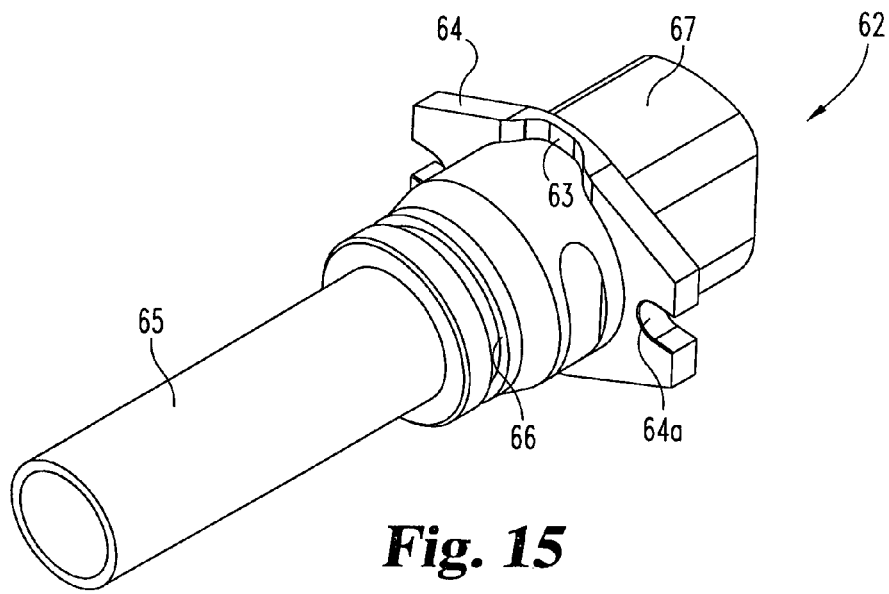
FIG. 15 is a perspective view of the FIG. 13 fuel heater.
Figure 16:
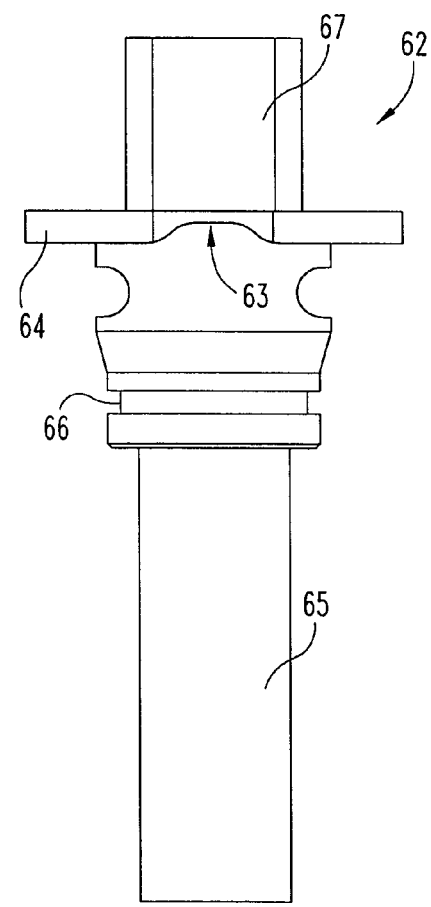
FIG. 16 is a front elevational view of the FIG. 15 fuel heater.
Figure 17:
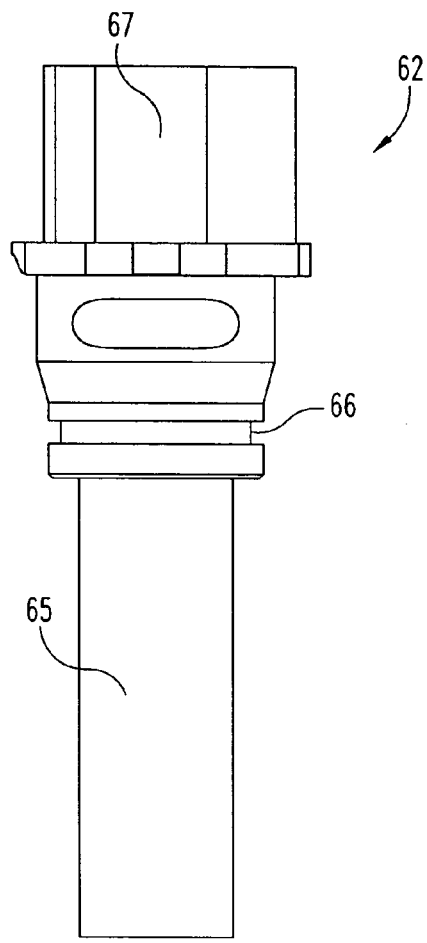
FIG. 17 is a side elevational view of the FIG. 15 fuel heater.
Figure 18:
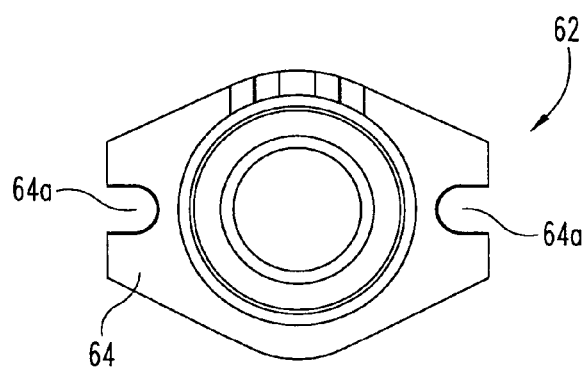
FIG. 18 is a bottom plan view of the FIG. 15 fuel heater.

Referring to FIGS. 13 and 14, another embodiment of the present invention is illustrated. Similar to what has already been described for housing 23 and fuel heater 21, except the reverse, separator housing 60 includes a raised protrusion 61 and the fuel heater 62 includes a recessed notch 63. While there are specifics to be described regarding the location and geometry for these cooperating structures, in general terms the cooperating assembly between housing 60 and fuel heater 62 is the reverse of what has been described for the first embodiment of the present invention based upon FIGS. 1–12.

Referring to FIGS. 15–18, the details of the fuel heater 62 are illustrated, including the shape and location of notch 63. Although fuel heater 62 has a slightly different configuration in terms of some of the surface shapes and dimensions, this is a way to show that the present invention is suitable for various styles of fuel heaters. Similar to fuel heater 21, fuel heater 62 includes a mounting flange 64, clearance slots 64a, heating end 65, annular channel 66 for receiving an O-ring seal, and electrical connector 67.

The protrusion 32 provided as part of fuel heater 21 has been replaced by notch 63 for fuel heater 62. The form of notch 63 illustrated in FIGS. 15–18 has a concave shape with the deepest point of the curvature being centered midway between the oppositely-disposed clearance slots 64a. Since the specific contour of the selected notch can assume a variety of shapes, a few alternatives are illustrated in FIGS. 25A–25H.

Figure 19:
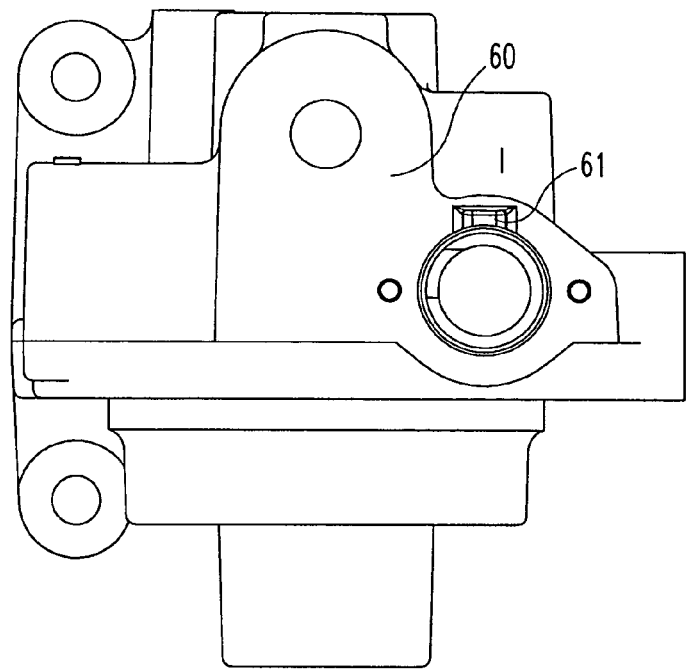
FIG. 19 is a front elevational view of the FIG. 13 fuel-water separator housing.
Figure 20:
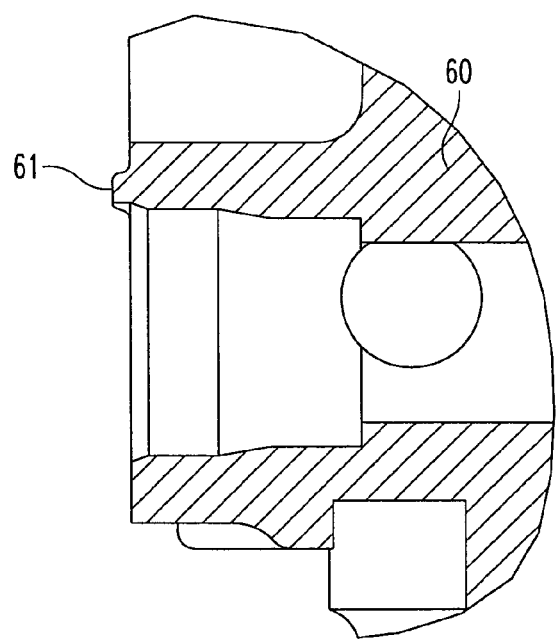
FIG. 20 is a partial, side elevational view, in full section, of the FIG. 19 fuel-water separator housing including a fuel heater-receiving bore.
Figure 21:
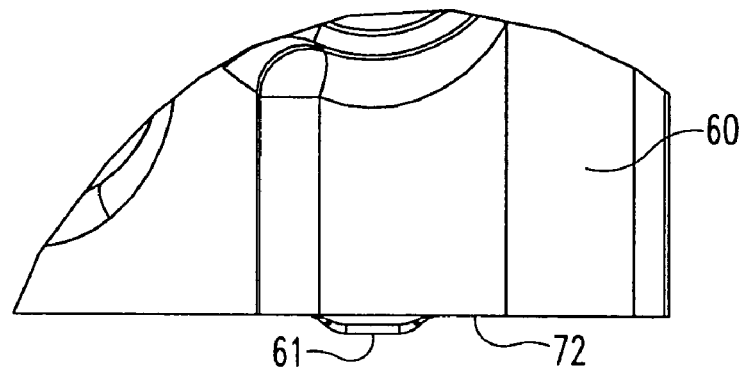
FIG. 21 is a partial, top plan view of the FIG. 19 fuel-water separator housing.
Figure 22:
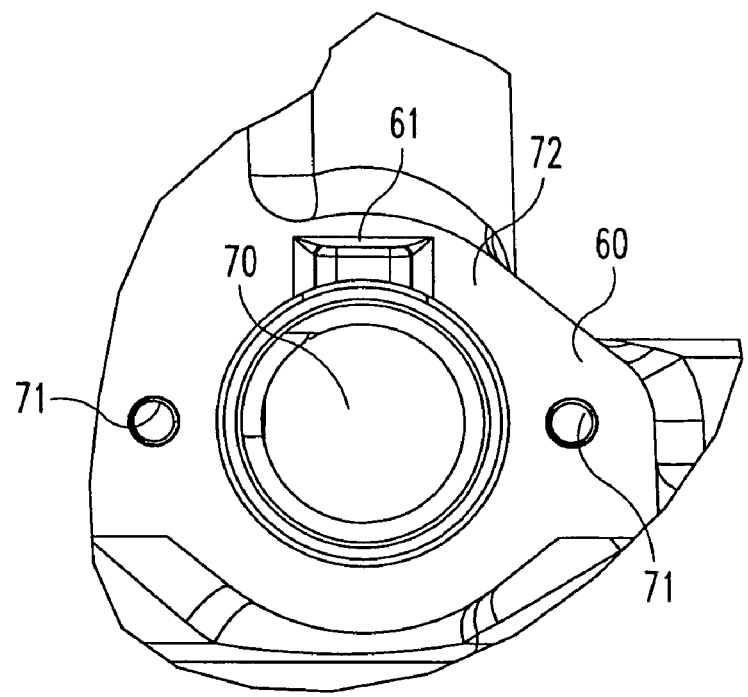
FIG. 22 is an enlarged, front elevational view of the FIG. 19 fuel-water separator housing.

Referring to FIGS. 19–22, the details of housing 60, heater bore 70, and protrusion 61 are illustrated, including the shape and location of protrusion 61 relative to the heater bore 70 and mounting holes 71. The front elevational view of FIG. 19 shows that the two mounting holes 71 are spaced 180 degrees apart on opposite sides of the heater bore 70. The protrusion 61 is centered at the top of the bore, approximately 90 degrees from each mounting hole. The side elevational section view of FIG. 20 and the top plan view of FIG. 21 illustrate the raised nature of protrusion 61 relative to surface 72 that defines the opening of heater bore 70. FIG. 22 provides an enlarged detail of protrusion 61 relative to the heater bore 70 and mounting holes 71.

While it was originally conceived that the cam action to facilitate the fuel heater 21 or 62 removal could be achieved by either embodiment, there is one situation that causes the second embodiment, with the notch in the fuel heater, to be preferred. In the situation where the fuel heater is provided as an after-market option, the heater bore needs to be plugged when there is no heater supplied. The preferred method of "plugging" the heater bore is to use a closing plug such as a cup plug or freeze plug that is constructed and arranged to press-fit in place in the heater bore. However, these styles of plugs do not seal properly if the housing includes the notch. There is no similar issue, regarding a proper seal, when the notch is replaced by a protrusion.

Figure 23:
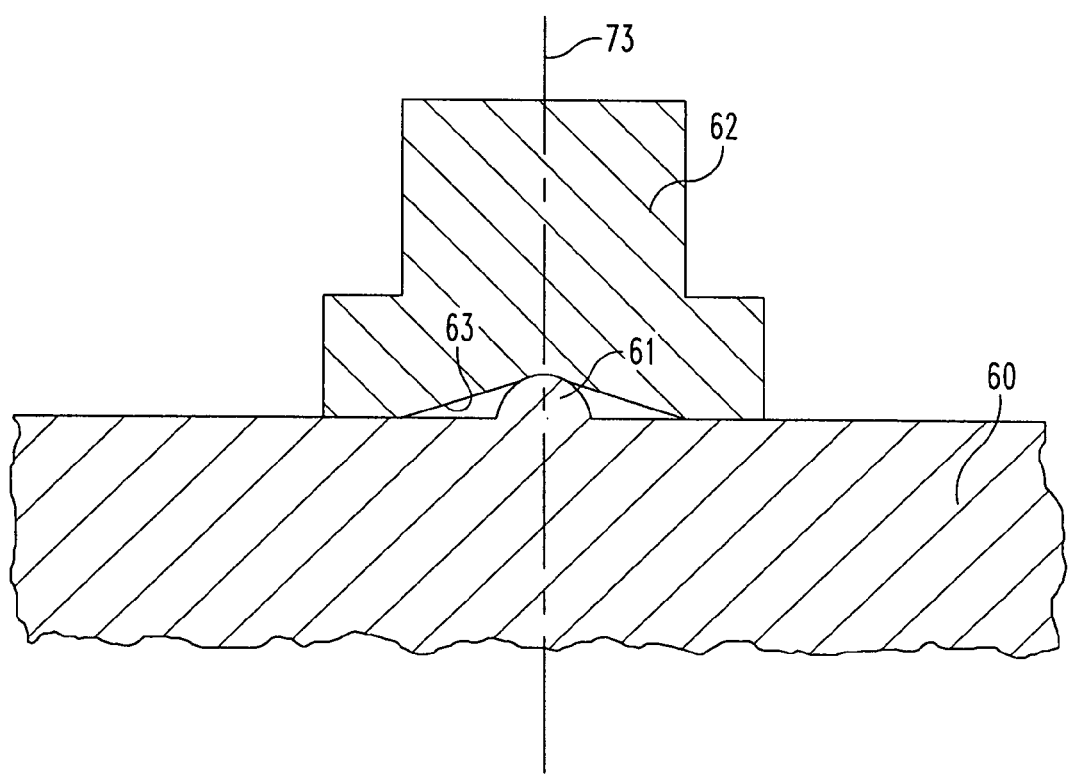
FIG. 23 is a diagrammatic illustration of the interfit between a fuel-water separator housing protrusion and a fuel heater notch according to the present invention.
Figure 25C:
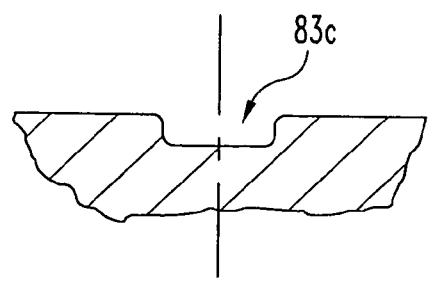
Figure 25D:
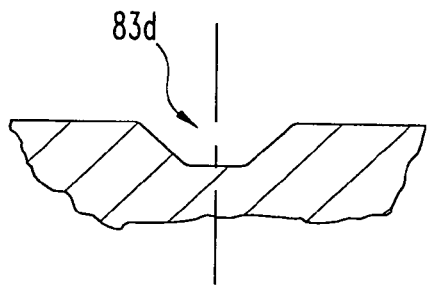
Figure 25E:
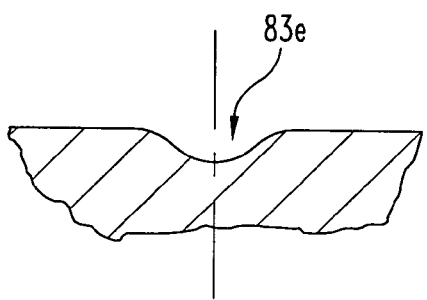
Figure 25F:
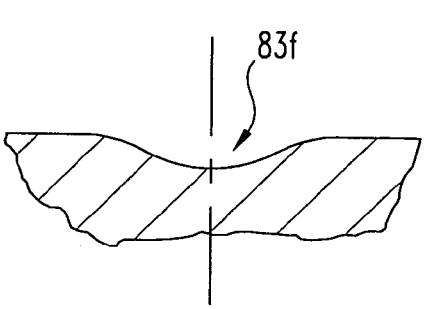
Figure 25G:
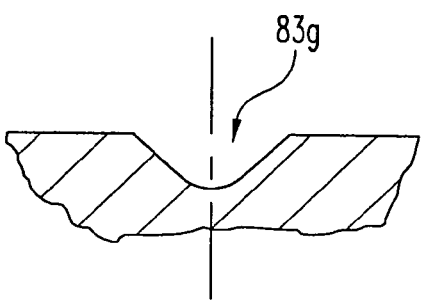
Figure 25H:
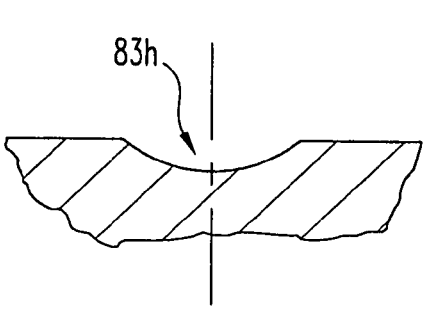

Referring now to FIG. 23, a diagrammatic illustration of a representative protrusion 61 received within a representative notch 63 is provided. This illustration is merely to give an idea of the protrusion/notch interface. In the preferred form of this specific embodiment, the protrusion 61 has a width dimension and a raised height dimension above surface 72 for the desired cooperation with the notch. The notch has a width dimension that is noticeably longer than the protrusion width and a notch centerline 73. The notch depth into the fuel heater is preferably deeper than the protrusion height such that there is a slight clearance. The center of notch 63 is rounded and the two sides each have a ramp incline of approximately 45 degrees, as illustrated.

Referring to FIGS. 24A–24C, three other suitable configurations for protrusion 61 are illustrated and are identified as protrusions 61a, 61b, and 61c. Protrusion 61a has straight, flat sides 77 and 78 and a rounded tip 79. Protrusion 61b has angled sides 80 and 81 that converge at tip 82 that can be pointed or slightly rounded. Protrusion 61c is a continuous curve.

Referring now to FIGS. 25A–25H, various notch configurations that are suitable for use as part of the present invention are illustrated and are defined as notches 83a–83h. Notches 83a–83d include various arrangements of straight, flat sides, some of which are parallel, some of which are inclined and converging. Notch 83c includes rounded corners. Notches 83e–83h include various arrangements of curved contours.

While several variations for the protrusion design and for the notch design have been disclosed, certain protrusions are preferred for certain notches. Protrusions 61a and 61b are considered to be suitable for all of the notch designs, while protrusion 61c is preferably used with notches 83e–83h.

Further, consistent with what has been described for notch 31 and protrusion 32, notch 63, including all of the alternative notch configurations, has a circumferential extent of not more than 90 degrees relative to the annular exterior of the fuel heater 62. With regard to protrusion 61 and the alternative protrusion configurations, protrusion 61 has a circumferential extent of not more than 90 degrees relative to the heater receiving bore 70.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In combination:
    a fuel heater housing defining a heater-receiving bore and a raised protrusion located adjacent said heater-receiving bore; and
    a fuel heater constructed and arranged for insertion into said heater-receiving bore, said fuel heater including a notch, said notch having a ramp portion and having a circumferential extent of not more than 90 degrees, wherein said raised protrusion is constructed and arranged for engaging said notch such that turning said fuel heater causes said protrusion to cooperate with said ramp portion to facilitate removal of said fuel heater from said heater-receiving bore.

2. The combination of claim 1 wherein said fuel heater is constructed and arranged for attachment to said housing.

3. The combination of claim 2 wherein said fuel heater includes a mounting flange, said notch being formed in said mounting flange.

4. The combination of claim 3 wherein said mounting flange including oppositely-disposed clearance slots for use in the attachment of said fuel heater to said housing.

5. The combination of claim 4 wherein said notch is centered between said oppositely-disposed clearance slots.

6. The combination of claim 5 wherein said fuel heater housing defining a pair of oppositely-disposed mounting holes for said fuel heater.

7. The combination of claim 6 wherein said raised protrusion being positioned between said pair of oppositely-disposed mounting holes.

8. The combination of claim 1 wherein said fuel heater includes a mounting flange, said notch being formed in said mounting flange.

9. The combination of claim 8 wherein said mounting flange including oppositely-disposed clearance slots for use in the attachment of said fuel heater to said housing.

10. The combination of claim 1 wherein said fuel heater housing defining a pair of oppositely-disposed mounting holes for said fuel heater.

11. The combination of claim 10 wherein said raised protrusion being positioned between said pair of oppositely-disposed mounting holes.

12. A fuel heater for assembly into a bore of a fuel filter housing, said fuel heater comprising:
a longitudinal body having a heating tip at one end and oppositely disposed at another end an electrical connector; and
said fuel heater defining a recessed notch constructed and arranged for cooperating with a raised protrusion on said fuel filter housing, wherein said recessed notch has a circumferential extent of not more than ninety degrees relative to said longitudinal body and cooperates with said fuel filter housing to facilitate removal of the fuel heater from the fuel filter housing.

13. The fuel heater of claim 12 wherein said fuel heater includes a mounting flange, said notch being formed in said mounting flange.

14. The fuel heater of claim 13 wherein said mounting flange including oppositely-disposed clearance slots for use in the attachment of said fuel heater to said housing.

15. The fuel heater of claim 14 wherein said notch is centered between said oppositely-disposed clearance slots.

16. The fuel heater of claim 15 wherein said recessed notch has a concave shape.

17. The fuel heater of claim 12 wherein said recessed notch has a concave shape.

18. In combination:
a housing member defining a receiving bore and having a raised protrusion adjacent said receiving bore, said raised protrusion having a circumferential extent of not more than ninety degrees relative to said receiving bore; and
an insert component constructed and arranged for inserting into said receiving bore, said insert component including a recessed notch that is constructed and arranged for engagement with said raised protrusion, wherein turning said insert component causes said protrusion to cooperate with said recessed notch to facilitate removal of said insert component from the receiving bore, by a camming action.

19. The combination of claim 18 wherein said insert component is constructed and arranged for attachment to said housing member.

20. The combination of claim 19 wherein said insert component includes a mounting flange, said notch being formed in said mounting flange.

21. The combination of claim 20 wherein said mounting flange including oppositely-disposed clearance slots for use in the attachment of said insert component to said housing member.

22. The combination of claim 21 Wherein said notch is centered between said oppositely-disposed clearance slots.

23. The combination of claim 22 wherein said housing member defining a pair of oppositely-disposed mounting holes for said insert component.

24. The combination of claim 23 wherein said raised protrusion being positioned between said pair of oppositely-disposed mounting holes.

25. The combination of claim 18 wherein said insert component includes a mounting flange, said notch being formed in said mounting flange.

26. The combination of claim 25 wherein said mounting flange including oppositely-disposed clearance slots for use in the attachment of said insert component to said housing member.

27. The combination of claim 18 wherein said housing member defining a pair of oppositely-disposed mounting holes for said insert component.

28. The combination of claim 27 wherein said raised protrusion being positioned between said pair of oppositely-disposed mounting holes.

29. The combination of claim 18 wherein said recessed notch including a concave shape.

30. The combination of claim 18 wherein said recessed notch including a curved surface.

31. In combination:
a fuel heater housing defining a heater-receiving bore and a raised protrusion located adjacent said heater-receiving bore, said raised protrusion having a first cooperating surface; and
a fuel heater constructed and arranged for insertion into said heater-receiving bore, said fuel heater including a notch, said notch having a second cooperating surface and having a circumferential extent of not more than ninety degrees, wherein said first cooperating surface and said second cooperating surface are constructed and arranged such that turning said fuel heater causes said first and second cooperating surfaces to engage each other and to cooperate to facilitate removal of said fuel heater from said heater-receiving bore.

32. The combination of claim 31 wherein said fuel heater is constructed and arranged for attachment to said housing.

33. The combination of claim 32 wherein said fuel heater includes a mounting flange, said notch being formed in said mounting flange.

* * * * *